UNITED STATES PATENT OFFICE 2,245,261

AZO COMPOUND AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application August 31, 1939, Serial No. 292,876

11 Claims. (Cl. 260—155)

This invention relates to arylazo compounds of a julolidine and their application to the art of dyeing or coloring.

The azo dye compounds of our invention have the general formula: $R-N=N-R_3$ wherein $R$ represents the residue of an aryl nucleus and $R_3$ represents the residue of a julolidine. The dye compounds of our invention can be prepared by diazotizing a suitable arylamine and coupling the diazonium compound obtained with a julolidine compound capable of coupling. In order that our invention may be clearly understood the structural formula of julolidine and its numbering is given hereinafter:

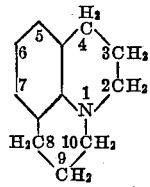

The numbering given is that which will be followed throughout the specification and claims. Coupling is believed to take place in the 6-position. Accordingly, no group should be present in this position and no group which would prevent coupling should be present.

While any julolidine compound capable of coupling may be employed in the preparation of the azo dye compounds of our invention, the julolidine coupling components ordinarily employed by us may be represented by the general formula:

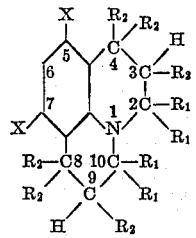

wherein $R_1$ represents a member selected from the group consisting of hydrogen and an alkyl group, $R_2$ represents a member selected from the group consisting of hydrogen, an alkyl group, a hydroxy group and a $O-R_4$ group, wherein $R_4$ represents a member selected from the group consisting of an alkyl group, an acyl group and an acid radical derived from phosphorus or sulfur and X represents a member selected from the group consisting of hydrogen, a hydroxy group, an alkyl group, an alkoxy group, a halogen atom and an acetamino group.

It will be understood that alkyl as used herein, unless otherwise indicated, includes not only unsubstituted alkyl groups such as a methyl group, an ethyl group, a propyl group or a butyl group but also substituted alkyl groups such as β-hydroxyethyl, β,γ-hydroxypropyl, β-methoxyethyl of β-ethoxyethyl, for example. Similarly, the term "alkoxy" includes not only unsubstituted alkoxy groups such as methoxy, ethoxy, a propoxy or a butoxy group but also substituted alkoxy groups such as β-methoxyethoxy, β-ethoxyethoxy or β'-hydroxyethyl-β-ethoxy, for example. Illustrative of halogen may be mentioned chlorine, bromine and iodine. Illustrative acyl groups include, for example,

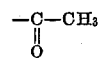

and

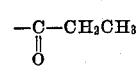

Further, by "an acid radical derived from phosphorus or sulfur" is meant such radicals, for example, as $-SO_3H$, $-P(OH)_2$,

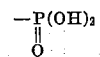

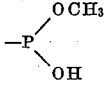

and

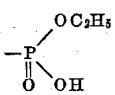

Both sulfonated and non-sulfonated compounds are included within the scope of our invention. The nuclear non-sulfonated compounds have, however, been found to be particularly of value for the dyeing of organic derivatives of cellulose and it is to these compounds and their application for the dyeing of organic derivatives of cellulose that our invention is particularly directed. These nuclear non-sulfonated compounds likewise possess some application for the dyeing of wool and silk. For the dyeing of organic derivatives of cellulose such as cellulose acetate silk, nuclear non-sulfonated dye compounds wherein R is an aryl nucleus of the benzene series are generally advantageous. The nuclear sulfonated compounds of our invention have little or no utility for the dyeing of organic derivatives of cellulose but possess application for the dyeing of regenerated cellulose, cotton, silk and wool. Compounds of our invention containing a nuclear free carboxylic acid group likewise possess some utility for the dyeing of these latter named materials. Preferably when the dye compounds of our invention are to be employed for the dyeing of organic derivatives of cellulose, they should contain no nuclear free carboxylic acid group. Orange, orange-red, red, bluish-red, blue and violet dyeings, for example, may be obtained employing the dye compounds of our invention.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials such as textile materials made of or containing organic derivatives of cellulose. It is, accordingly, an object of our invention to provide a new class of azo dyes suitable for the dyeing or coloration of organic derivatives of cellulose.

Another object of our invention is to provide a process for the dyeing or coloration of organic derivatives of cellulose. A further object is to produce dyed textile materials made of or containing an organic derivative of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The following examples illustrate the preparation of the azo dye compounds of our invention:

PART I.—DYES FOR ORGANIC DERIVATIVES OF CELLULOSE

*Example 1*

1 gram mole of p-aminoacetophenone is dissolved in 1000 parts of water containing about 295 parts of 36% hydrochloric acid. The resulting solution is cooled to a temperature approximating 0–5° C. and the p-aminoacetophenone is diazotized by slowly adding, with stirring, a water solution of 69 parts of sodium nitrite. The diazotization is complete when a positive starch potassium iodide test is obtained after 20 minutes.

1 gram mole of julolidine is dissolved in a dilute hydrochloric acid solution and the resulting mixture is cooled to a temperature approximating 0–10° C. The diazonium compound prepared as described above is then slowly added, with stirring, while maintaining a temperature of 0–10° C. Following the addition of the diazonium compound, the mixture is permitted to stand for a while after which it is slowly made neutral to Congo red paper by the addition of sodium acetate or sodium carbonate. Upon completion of the coupling reaction which takes place the dye compound formed is recovered by filtration, washed with water and dried. The dye compound obtained colors cellulose acetate silk an orange shade.

*Example 2*

1 gram mole of 1-β-hydroxyethoxy-2-amino-5-nitrobenzene is diazotized and the diazonium compound obtained is coupled with 1 gram mole of julolidine. Diazotization, coupling and recovery of the dye compound formed may be carried out in accordance with the general method described in Example 1. The dye compound obtained colors cellulose acetate silk a rubine shade.

*Example 3*

1 gram mole of 1-amino-2-chloro-4-nitrobenzene is diazotized and the diazonium compound obtained is coupled with 1 gram mole of 3,9-dihydroxyjulolidine. Diazotization, coupling and recovery of the dye compound formed may be carried out as described in Example 1. The dye compound obtained colors cellulose acetate silk rubine-violet shades.

The following tabulation further illustrates compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 3, inclusive.

| Amine | Coupling component | Color on cellulose acetate silk |
|---|---|---|
| p-Aminoacetophenone | 3-hydroxyjulolidine | Orange. |
| Do | 5-chloro-10-ethyljulolidine | Do. |
| Do | 3-methyl-7-bromojulolidine | Do. |
| p-Nitroaniline | 3-hydroxy-7-methyljulolidine | Rubine-violet. |
| Do | 2-β-hydroxyethyl-5-iodojulolidine | Red. |
| Do | 7-acetaminojulolidine | Violet. |
| 1-amino-2,4-dinitrobenzene | 3,9-dihydroxy-7-methyljulolidine | Do. |
| 1-amino-2,4-dinitro-6-chlorobenzene | do | Reddish-blue. |
| 2-amino-3,5-dinitrophenylmethylsulfone | 7-methoxy-3,8-dihydroxyjulolidine | Blue. |
| Do | 5-ethoxy-10-methyljulolidine | Do. |
| 2-amino-3,5-dinitro-6-phenylmethylketone | 4,8-dihydroxy-5-methoxy-7-methyljulolidine | Do. |
| 1-amino-2,4,6-trinitrobenzene | 3-sulfatojulolidine | Do. |
| p-Aminoazobenzene | 3-acetoxy-9-β-hydroxyethoxyjulolidine | Red. |
| 1-amino-2-hydroxy-4-nitro-6-chlorobenzene | 2-methyl-3-phosphito-4-methyl-9-phosphatojulolidine | Magenta. |
| 2-amino-6-methoxybenzothiazole | Julolidine | Red. |
| 2-aminobenzothiazole | 3-hydroxyjulolidine | Do. |

PART II.—DYES FOR REGENERATED CELLULOSE, COTTON, SILK AND WOOL

*Example 4*

1 gram mole of p-aminobenzene sulfonic acid is diazotized in the usual manner and the diazonium compound obtained is coupled with 1 gram mole of julolidine in a dilute cold hydrochloric acid solution. Coupling is completed by adding sodium carbonate until the mixture is just alkaline to litmus following which the dye compound is salted out by the addition of sodium chloride, recovered by filtration, washed and dried. The dye compound obtained colors regenerated cellulose, silk, cotton and wool orange shades.

*Example 5*

1 gram mole of 5-nitro-2-aminobenzene sulfonic acid is diazotized and the diazonium compound obtained is coupled with 1 gram mole of 2,7-dimethyljulolidine. The dye compound obtained colors regenerated cellulose, cotton, silk and wool violet shades from an aqueous solution that may contain a salt such as sodium chloride.

The following tabulation illustrates compounds included within the scope of our invention together with the color they produce on regenerated cellulose, cotton, silk and wool. The compounds indicated below may be prepared by diazotizing the amines listed under the heading "Amine" and coupling the diazonium compound obtained with the compounds specified entitled "Coupling component." The diazotization and coupling reactions may, for example, be carried out following the general procedure described hereinbefore.

Both water-soluble and water-insoluble azo dye compounds are included within the scope of our invention. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. For a more complete description of how the water-insoluble azo dye compounds of our invention can be employed for the dyeing of organic derivatives of cellulose reference may be had to our U. S. Letters Patent No. 2,115,030, issued April 26, 1938. The water insoluble azo dye compounds of our invention, as previously noted, also possess application for the dyeing of wool and silk and they may be applied to these materials in the same manner as they are applied to organic derivatives of cellulose.

The water soluble dye compounds of our invention may be applied to wool, silk, cotton, regenerated cellulose and (depending on the nature and position of the water solubilizing group) organic derivatives of cellulose textile materials

| Amine | Coupling component | Color on regenerated cellulose, cotton, silk and wool |
|---|---|---|
| 2-amino-3,5-dinitrobenzene sulfonic acid | 3-hydroxy-7-methoxyjulolidine | Blue. |
| Do | 2-glyceryljulolidine | Do. |
| Do | 4-ethyl-9-sulfatojulolidine | Do. |
| Do | 7-propyl-8-sulfatojulolidine | Do. |
| 3,3'-dimethoxy-6,6'-disulfonic benzidine (1 mole) | 3-sulfato-5-methyljulolidine (2 moles) | Orange-red. |
| 1-amino-8-naphthol-2,4-disulfonic acid | 3,7,8-trihydroxyjulolidine | Reddish-blue. |
| 3,5-dinitroanthranilic acid | 3-sulfato-9-phosphitojulolidine | Purple. |
| Do | 4-phosphatojulolidine | Do. |

The dye compound prepared by coupling diazotized 1-amino-2,4,6-trinitrobenzene with 3-sulfatojulolidine likewise colors silk and wool blue shades. The dye compound prepared by coupling diazotized 1-amino-2-hydroxy-4-nitro-6-chlorobenzene with 2 - methyl - 3 - phosphito-4-methyl-9-phosphatojulolidine colors silk and wool a magenta shade.

It will be understood that the specific dye compounds given hereinbefore are intended to be illustrative and not limitative of the invention. Any of the amines disclosed herein may be diazotized and the diazonium compounds obtained coupled with any of the coupling components shown herein to obtain dye compounds included within the scope of our invention.

In order that the preparation of the azo dye compounds of our invention may be clearly understood, the preparation of the intermediate compounds which are employed in their manufacture is indicated hereinafter.

*Preparation of julolidine*

This compound may be prepared as indicated on page 206 of Richter's "Organic Chemistry" (D'Albe), vol. 3, 1923.

Substituted julolidines may be prepared either as described or in accordance with the methods described in Berichte der Deutschen Chemischen Gesellschaft, vol. 51, pages 1215–1227 (1918); Journal American Chemical Society, vol. 42, pages 1720–1725 (1920) or German Patent No. 284,291.

from an aqueous solution of the dye which may contain salt. These water-soluble dye compounds can be applied to the fiber in substantially the same manner as the water-insoluble dye compounds. In the case of the water soluble dye compounds, however, the use of a dispersing or solubilizing agent is not necessary. It will be understood, of course, that the above remarks concerning the application of the dye compounds of our inventon are merely illustrative and that any of the customary methods for applying dyes of the character here involved to textile fibers can be employed.

We claim:

1. The azo dye compounds having the general formula: R—N=N—R₃ wherein R—N=N— represents the residue of a diazotized member selected from the group consisting of an arylamino compound of the benzene series, an arylamino compound of the naphthalene series and an aminobenzothiazole compound and R₃ represents the residue of a julolidine coupling component.

2. The azo dye compounds having the general formula: R—N=N—R₃ wherein R represents the residue of an aryl nucleus of the benzene series and R₃ represents the residue of a julolidine coupling component.

3. The nuclear non-sulfonated azo dye compounds having the general formula: R—N=N—R₃ wherein R represents the residue of an aryl nucleus of the benzene series and $R_3$ represents the residue of a julolidine coupling component.

4. The azo dye compounds having the general formula: $R—N=N—R_3$ wherein R represents the residue of an aryl nucleus of the benzene series and $R_3$ represents the residue of julolidine, said julolidine residue constituting the coupling component.

5. The azo dye compounds having the general formula:

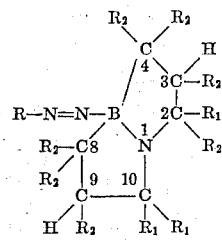

wherein $R—N=N—$ represents the residue of a diazotized member selected from the group consisting of an aryl amino compound of the benzene series, an arylamino compound of the naphthalene series and an aminobenzothiazole compound, B represents an aryl nucleus of the benzene series containing but one benzene ring joined to the nitrogen atom numbered 1 through its carbon atom in the para position to the azo bond and to the carbon atoms numbered 4 and 8 through its carbon atoms in the meta positions to the azo bond, $R_1$ represents a member selected from the group consisting of hydrogen and an alkyl group and $R_2$ represents a member selected from the group consisting of hydrogen, an alkyl group, a hydroxy group and a O—$R_4$ group, wherein $R_4$ represents a member selected from the group consisting of an alkyl group, an acyl group and an acid radical derived from phosphorus or sulfur.

6. The azo dye compounds having the general formula:

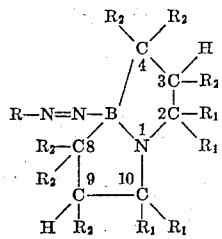

wherein $R—N=N—$ represents the residue of a diazotized arylamino compound of the benzene series, B represents an aryl nucleus of the benzene series containing but one benzene ring joined to the nitrogen atom numbered 1 through its carbon atom in the para position to the azo bond and to the carbon atoms numbered 4 and 8 through its carbon atoms in the meta positions to the azo bond, $R_1$ represents a member selected from the group consisting of hydrogen and an alkyl group and $R_2$ represents a member selected from the group consisting of hydrogen and an alkyl group and $R_2$ represents a member selected from the group consisting of hydrogen, an alkyl group, a hydroxy group and a O—$R_4$ group, wherein $R_4$ represents a member selected from the group consisting of an alkyl group, an acyl group and an acid radical derived from phosphorus or sulfur.

7. Textile material colored with an azo dye compound having the general formula: $R—N=N—R_3$ wherein $R—N=N—$ represents the residue of a diazotized member selected from the group consisting of an arylamino compound of the benzene series, an arylamino compound of the naphthalene series and an aminobenzothiazole compound and $R_3$ represents the residue of a julolidine coupling component.

8. An organic derivative of cellulose colored with a nuclear non-sulfonated azo dye compound having the general formula: $R—N=N—R_3$ wherein $R—N=N—$ represents the residue of a diazotized member selected from the group consisting of an arylamino compound of the benzene series, an arylamino compound of the naphthalene series and an aminobenzothiazole compound and $R_3$ represents the residue of a julolidine coupling component.

9. Material made of or containing an organic derivative of cellulose colored with a nuclear non-sulfonated azo dye compound having the general formula: $R—N=N—R_3$ wherein R represents the residue of an aryl nucleus of the benzene series and $R_3$ represents the residue of a julolidine coupling component.

10. A cellulose acetate colored with a nuclear non-sulfonated azo dye compound having the general formula: $R—N=N—R_3$ wherein $R—N=N—$ represents the residue of a diazotized member selected from the group consisting of an arylamino compound of the benzene series, an arylamino compound of the naphthalene series and an aminobenzothiazole compound and $R_3$ represents the residue of a julolidine coupling component.

11. A cellulose acetate colored with a nuclear non-sulfonated azo dye compound having the general formula: $R—N=N—R_3$ wherein R represents the residue of an aryl nucleus of the benzene series and $R_3$ represents the residue of a julolidine coupling component.

JOSEPH B. DICKEY.
JAMES G. McNALLY.

CERTIFICATE OF CORRECTION.

Patent No. 2,245,261.                                         June 10, 1941.

JOSEPH B. DICKEY, ET AL.

It is hereby certified that error appears in the printed specification of the above numbered patent requiring correction as follows: Page 4, first column, lines 10 to 20 inclusive, claim 5, in the formula, for the member "$R_2$" attached to the carbon atom in the 2-position read --$R_1$--; and that the said Letters Patent should be read with this correction therein that the same may conform to the record of the case in the Patent Office.

Signed and sealed this 2nd day of September, A. D. 1941.

Henry Van Arsdale, (Seal)                                         Acting Commissioner of Patents.